Patented June 12, 1951

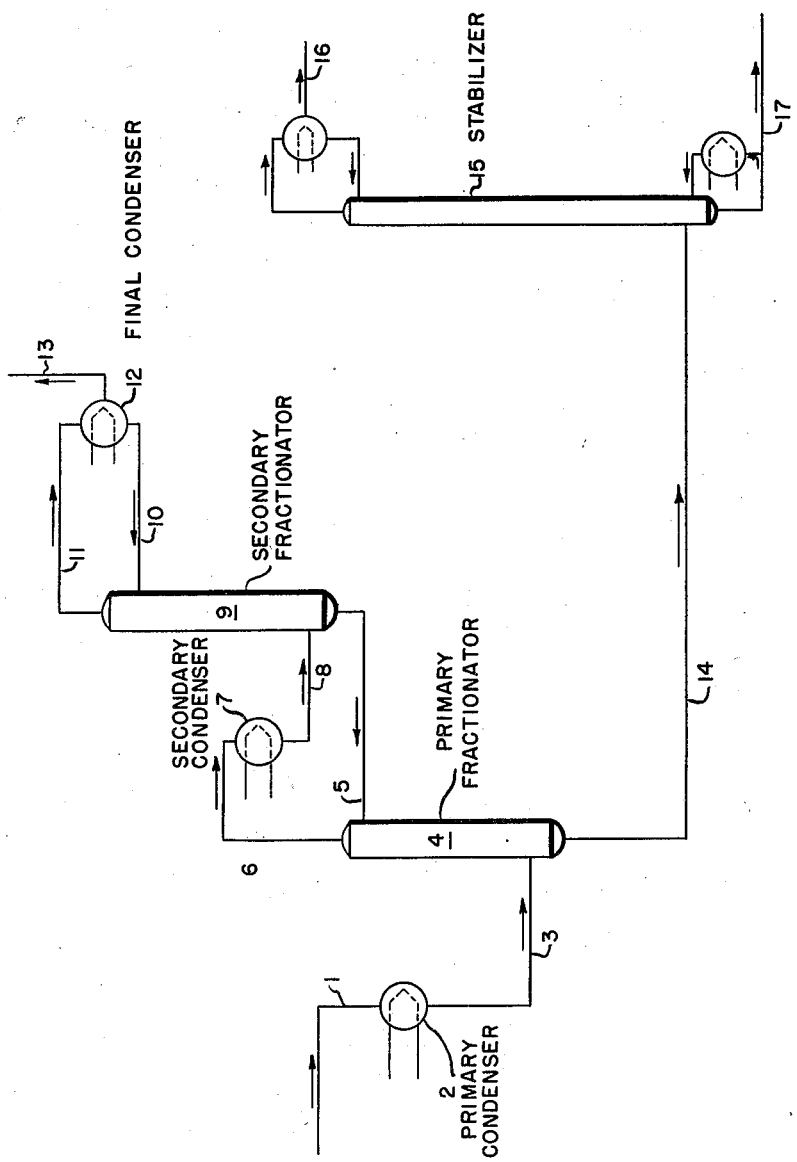

2,556,833

UNITED STATES PATENT OFFICE 2,556,833

ETHYL CHLORIDE RECOVERY

Henry H. Wall, Jr., Baton Rouge, La., assignor to Ethyl Corporation, New York, N. Y., a corporation of Delaware Application March 17, 1950, Serial No. 150,134

2 Claims. (Cl. 62—175.5)

This invention relates to the manufacture and recovery of ethyl chloride. More specifically the invention relates to the recovery of ethyl chloride from process streams containing substantial amounts of ethane impurity or diluent.

Ethyl chloride can be manufactured by several chemical reactions. Principally, manufacture is by the catalyzed reaction of hydrogen chloride and ethylene and by the chlorination of ethane. These reactions have come to the fore in recent years, because of the availability and economy of ethylene and ethane hydrocarbon streams from petroleum refining.

The reaction products stream obtained in producing ethyl chloride from either ethane or ethylene contains substantial amounts of diluents or impurities which must be removed in obtaining a purified ethyl chloride product. In particular, a substantial amount of ethane is normally present. The ethane impurity or diluent arises as a result of the usual excess employed in a chlorination process, or by reason of the ethane normally present in the ethylene feed when the ethyl chloride is produced by hydrogen chloride addition.

The ethane impurity presents a severe purification problem because ethane is relatively close to ethyl chloride in volatility, and several close fractionations are ordinarily necessary. The problem has become accentuated because the trend is to carry out the formation reaction at elevated temperatures, such conditions being required in chlorination processes, or when a dilute ethylene stream is reacted with hydrogen chloride. The reaction products streams from such reactions are therefore at an elevated temperature, of substantially over 100° F., in addition to being dilute streams of ethyl chloride.

The recovery of ethyl chloride from such streams, which are not only at an elevated temperature, but also are dilute, has, heretofore, been a difficult and expensive operation. This condition arises because of the low temperatures, substantially below 0° F., required in order to completely recover the ethyl chloride. Maintaining such low temperatures entails the use of refrigerants, which in turn requires a large investment in refrigeration compressors and other auxiliary equipment. It has heretofore been the practice and has been considered necessary to cool the entire reaction products stream to a low fractionation temperature, in the range of —15° F. and lower, in order to effect complete recovery. This low temperature cooling introduces a further difficulty in the numerous processes wherein a recycle stream is necessarily taken from the recovery section and returned to the reactor. In such operations, cooling an entire product stream results in an excessive return of inert diluents to the reactor, because of their solution in the ethyl chloride condensed. This unfavorable result is particularly marked in an ethylene hydrochlorination process.

The object of my invention is to mitigate these prior difficulties. A specific object is to provide a new and improved process for the recovery of ethyl chloride from a stream thereof containing a substantial amount of ethane as an impurity. A further object is to provide a recovery process giving large economies in the recovery of ethyl chloride from such streams which are initially at elevated temperatures. An additional object is to provide a recovery process for use in conjunction with the manufacture of ethyl chloride from ethylene, wherein the amount of dissolved ethane in liquefied streams is minimized.

These objects are fully accomplished by the process, which comprises an integrated combination of partial condensations and fractionations at different temperature levels. According to my process, the ethyl chloride is recovered by subjecting the entire stream to a primary condensation and fractionation, and the vapor therefrom to a secondary condensation and fractionation. The liquid from the secondary fractionation is returned to the primary fractionation as a primary reflux liquid. The liquid bottoms from the primary fractionation is transferred to a conventional fractionation column or stabilizer, wherein residual impurities more volatile than the ethyl chloride are stripped or fractionated.

The operation of the process can be more fully understood from the following more detailed description and examples and from the accompanying figure. The figure illustrates a typical embodiment of the process.

The primary and secondary fractionations differ from the conventional fractional distillation operation in that no reboiler is used. The heat requirements for the fractionating contact between the vapor and a colder reflux liquid are supplied by the enthalpy of the vapor portion of the feed.

Referring to the figure, showing a typical arrangement of equipment, the dilute ethyl chloride feed is received from the manufacturing reactors through line 1, at a temperature of substantially over 100° F., and an elevated pressure of 100 pounds per sq. in. or above. The feed is then cooled in primary condenser 2 to a temperature sufficient to condense from 30 to 40 percent of the ethyl chloride present, but not below a temperature of 90° F. The part liquid-part vapor stream which results is introduced through line 3 to a primary fractionator 4. This fractionator is normally essentially a bubble plate column, but no reboiler is required. The vapor rises in the fractionator in fractionation contact with a cold primary reflux liquid. The primary reflux is introduced at the top of the fractionator by line 5 and comprises the bottoms liquid stream from secondary fractionator 9. The rising vapors are partially stripped of the ethyl chloride content, but more important is the fact that the impurities in the downcoming, or reflux, liquid, are greatly reduced, solely by the fractionation action of the rising vapors.

The vapor discharged from primary fractionator 4 passes to secondary condenser 7 through line 6. In the secondary condenser, from 85 to 95 percent of the ethyl chloride content is condensed at a temperature not lower than —20° F. The entire stream of both liquid and vapor is then passed through line 8 to secondary fractionator 9. Here the vapor again rises, in fractionation contact with a downcoming secondary reflux, the reflux being established by condensate introduced through line 10. Vapor is discharged from the secondary fractionator through line 11 and is cooled in condenser 12 to a temperature of from —70 to —90° F. The ethyl chloride content is substantially all present in the second reflux formed in condenser 12, the non-condensed components being discharged through line 13.

The bottoms from primary fractionator 4 includes substantially all the ethyl chloride present in the feed stream, and in addition is at a sufficiently high temperature so that the amount of dissolved impurities is minimized. This combined liquid stream is transferred through line 14 to a conventional fractionation column or stabilizer 15. The residual impurities which are more volatile than ethyl chloride are removed by this column, the stabilized ethyl chloride being removed through line 17. The impurities which are fractionated from the ethyl chloride are discharged by line 16. The disposition of these impurities will depend of course, on their composition. In some instances, they can advantageously be recycled to the reaction for producing ethyl chloride, whereas in other cases they will be useful primarily for their fuel value.

The details and significant features of the process can best be understood from a working example. As heretofore explained, the recovery process is particularly advantageous in combination with the production of ethyl chloride by the hydrochlorination of ethylene in the presence of a substantial amount of ethane impurity. The following working example describes such a combination, the initial ethylene feed stream containing 29 percent ethylene and 38 per cent ethane. By percent is meant the mole percentage of the component.

*Example*

The ethylene feed stream, containing approximately 23 percent hydrogen, 29 percent ethylene and 38 percent ethane and small amounts of minor impurities such as nitrogen, is combined with a hydrogen chloride feed stream. The hydrogen chloride is used in sufficient quantity to correspond to the ethylene content. The mixed feed is fed to a reactor where the ethylene and hydrogen chloride are reacted under the influence of a catalyst to give ethyl chloride. Because of the low concentration of the reactants, hydrogen chloride and ethylene, it is essential to carry out the reaction at an elevated temperature and pressure.

A reactor pressure of 125 pounds per square inch gauge, and a temperature of 120° F. are used. On being discharged from the reactor, the composition of the product stream is as follows:

| Component | Mole Per cent |
|---|---|
| hydrogen | 19 |
| ethylene | 1 |
| ethane | 35 |
| ethyl chloride | 35 |
| other components | 10 |
| | 100 |

This reactor products stream is then passed to the recovery system, using the same embodiment and equipment heretofore described and shown in the figure. The entire products stream is fed to the primary condenser 2 and 33 percent of the ethyl chloride condensed at 100° F. The condensate is of relatively high purity, containing 90 percent ethyl chloride and 8 percent ethane. The mixture of vapor and liquid from the primary condenser 2 is then fed to the primary fractionator 4.

The primary fractionator is a 6 plate bubble tower, and is operated with a bottom temperature of approximately 100° F. and at a pressure of approximately 120 pounds per square inch. The vapor-liquid mixture from the primary condenser is introduced to the bottom of the column, the vapor immediately separating and rising. The rising vapor is contacted with a primary reflux introduced through line 5 at the top plate. The primary reflux, which is at a temperature of —15° F. when it is fed, contains only 55 percent ethyl chloride. However, due to the fractionating action of the rising vapor, the impurities are stripped therefrom and the ethyl chloride concentration increased to approximately 90 percent, or equivalent to the liquid phase already formed in the primary condenser.

The vapor from the primary fractionator 4 contains about 17 percent ethyl chloride and is passed through line 6 to secondary condenser 7. Here about 93 percent of the ethyl chloride is condensed at —15° F. The entire stream, both liquid and vapor is fed through line 8 to the bottom of secondary fractionator 9, which is operated at a pressure of 110 pounds per square inch. This fractionator is a 20 plate column. The vapor and liquid introduced are immediately separated therein, the vapor rising in fractionating contact with a secondary reflux returned through line 10.

The secondary reflux, initially at a temperature of —70° F., contains only about 1 percent ethyl chloride. The fractionating action of the rising vapor, however, accomplishes a concentration by stripping a large portion of the more volatile impurities, so that the liquid reaching the bottom is essentially the same in composition as the liquid produced in the secondary condenser 7, containing 55 percent ethyl chloride.

The vapor overhead discharged from the secondary fractionator 9 through line 11 contains only about 0.1 percent ethyl chloride. Substantially all the ethyl chloride is condensed at —70°

F. by final condenser 12, the residue gases containing only a trace of ethyl chloride.

The bottom stream from primary fractionator 4, containing substantially all the ethyl chloride at the relatively high concentration of 90 percent, is then fed to the stabilizer 15. The stabilizer is operated at a pressure of 140 pounds per square inch and removes the residual impurities which are more volatile than the ethyl chloride. The bottoms from the stabilizer is an ethyl chloride stream of better than 99 percent purity, containing small amounts of impurities which are less volatile than the ethyl chloride, such as isopentane or ethylene dichloride. If desired, these trace impurities are easily removed by an additional fractionation in which the ethyl chloride is removed as an overhead. For many purposes, this additional rerunning operation is not essential. The overhead from the stabilizer will vary in composition and is frequently recycled to the reaction step because of appreciable quantities of ethyl chloride therein. The recovery of ethyl chloride is over 95 percent of the ethyl chloride in the reaction products.

It will be seen from the foregoing example that the process accomplished a condensation of a substantial fraction of the ethyl chloride at the elevated temperature of 100° F., which makes possible the use of water cooling only to bear a large portion of the heat load. Further, since all the liquid phase formed in the recovery steps is subjected to this relatively elevated temperature before it is transferred to the final fractionation, or stabilizing column, there is no opportunity for the solution of appreciable quantities of ethane and other undesirable impurities in the ethyl chloride.

The recovery process is capable of great flexibility with respect to the composition of the feed stream of reaction products and also with respect to the temperature and pressure thereof. The process is of course particularly applicable to product mixtures which are initially appreciably above 100° F. This facilitates the condensation of 30 to 40 percent of the ethyl chloride originally present. In general, in those unusual instances where the reaction products are only slightly above 90° F., some benefit will be obtained even if the primary condensing step is omitted. However, in the usual case where the feed stream is at a temperature appreciably above 100° F., the initial or primary condenser is highly beneficial in that a substantial part of the heat transfer requirement can be met with cooling water in the primary condenser, thereby achieving the maximum economies for the process.

The vapor and condensate from the primary condenser should not be cooled below 90° F. A lower temperature is detrimental because of the substantial increase in the amount of ethane dissolved in the liquid phase, which is thereby included in the feed to the final fractionator or stabilizer. The desired high ethyl chloride concentration in the feed to the stabilizer is assured by condensing only from 30 to 40 percent of the total ethyl chloride present, and by maintaining the condensing temperature above 90° F.

As will be readily understood, the exact amount of ethyl chloride condensed by any cooling step is affected by the initial feed composition and the pressure on the mixture. No specific pressure is critical to the recovery process, provided only, of course, that the pressure is sufficiently elevated for the condensing and fractionation steps involved. In general pressures of the range 100 to 200 pounds per square inch, guage, are preferred.

The secondary condenser is operated to condense a specified amount of ethyl chloride present at a temperature not below a minimum level, similarly to the primary condenser. The temperature should be above —20° F. Here again this minimum temperature is necessary because of the finding of strongly detrimental factors associated with lower temperatures. A temperature above —20° F. insures that propane refrigerant can be utilized to condense the second large fraction of the ethyl chloride recovered. Propane as a refrigerant is more economical than other lower temperature refrigerants, so that this temperature limitation provides the most economical operation. Even more important, however, is the fact that by a temperature not lower than —20° F., the bulk of the ethyl chloride is condensed, but the accompanying ethane which is also liquefied does not exceed the quantity susceptible of being removed, in the primary fractionator, by the non-condensed vapor from the primary condenser.

The temperature of the final condenser is maintained at a temperature above —90° F. This temperature requirement insures that although only a trace of ethyl chloride is present in the vapor phase discharged, the liquid phase returned to the fractionator is still susceptible of concentration in the secondary fractionator to an ethyl chloride content corresponding to the liquid phase produced in the secondary condenser.

As heretofore stated, the process is beneficial through a wide range of compositions of the reaction products which comprise the feed thereto. Since the difficulty previously encountered arises because of the presence of substantial amounts of ethane diluent, the benefits to be obtained by the process increase in magnitude with an increase in the amount of copresent ethane impurity. If, however, the ethane impurity is present in very high concentrations, it is frequently found more economical to revise the initial ethyl chloride producing reaction. In an ethylene hydrochlorination process, for example, if the ethane in the ethylene feed stream is sufficient to be more than 1.5 times the volume of ethyl chloride produced, it will be preferred to specially purify the ethylene feed stream prior to reaction. The recovery operation is also of particular benefit when the ethane:ethyl chloride ratio is greater than 0.75:1.0. When the ethane is present in a lower proportion than indicated, the prior recovery methods are adequate. The recovery process is therefore intended for ethyl chloride feed streams wherein the ethane is in such amounts that the ethane:ethyl chloride mole ratio is from 0.75:1.0 to 1.5:1.0.

It will be noted in the preceding example that in both the primary and secondary fractionators, the fractionation accomplishes a concentration of the reflux streams to a composition corresponding to the liquid phase condensed in the preceding primary and secondary condensers, respectively. This mode of operation while not limiting represents the optimum condition, providing the fullest utilization of the enthalpy of the vapor feeds to the fractionators. This degree of fractionation is not essential, but a lower degree results in the presence of more dissolved ethane in the liquid feed to the final fractionator and hence, reduces the degree of benefit obtainable by the process.

Many other variations or embodiments of the

I claim:

1. The process of recovering ethyl chloride from a reaction products stream containing ethane as an impurity, the ethane:ethyl chloride mole ratio being from 0.75:1.0 to 1.5:1.0, comprising condensing from 30 to 40 percent of the ethyl chloride at a temperature above 90° F., passing the vapor and liquid formed to a primary fractionator, contacting the vapor therein with a primary reflux, discharging the vapor and condensing from 85 to 95 percent of the ethyl chloride therein at a temperature above −20° F., passing the vapor and liquid so formed to a secondary fractionator, contacting the vapor therein with a secondary reflux, then discharging the vapor and condensing substantially all the ethyl chloride therein at a temperature above −90° F., discharging the vapor and returning the liquid as the secondary reflux, returning liquid from the secondary fractionator to the primary fractionator as the primary reflux, and fractionating the liquid from the primary fractionator thereby separating residual impurities more volatile than ethyl chloride.

2. The process of recovering ethyl chloride from a reaction products stream containing ethane as an impurity, the ethane:ethyl chloride mole ratio being from 0.75:1.0 to 1.5:1.0, comprising condensing from 30 to 40 percent of the ethyl chloride at a temperature above 90° F., passing the vapor and liquid formed to a primary fractionator, contacting the vapor therein with a primary reflux, discharging the vapor and condensing from 85 to 95 percent of the ethyl chloride therein at a temperature above −20° F., passing the vapor and liquid so formed to a secondary fractionator, contacting the vapor therein with a secondary reflux, then discharging the vapor and condensing substantially all the ethyl chloride therein at a temperature above −90° F., discharging the vapor and returning the liquid as the secondary reflux, returning liquid from the secondary fractionator to the primary fractionator as the primary reflux, and withdrawing concentrated liquid ethyl chloride from the primary fractionator.

HENRY H. WALL, Jr.

REFERENCES CITED

The following references are of record in the file of this patent:

UNITED STATES PATENTS

| Number | Name | Date |
|---|---|---|
| 2,274,094 | Rupp | Feb. 24, 1942 |
| 2,478,362 | Benning | Aug. 9, 1949 |
| 2,487,147 | Latchum | Nov. 8, 1949 |